May 26, 1953          S. T. GRESKE          2,639,535
FISHING TROLLEY WITH IMPROVED TROLLEY FRAME
Filed Aug. 3, 1950
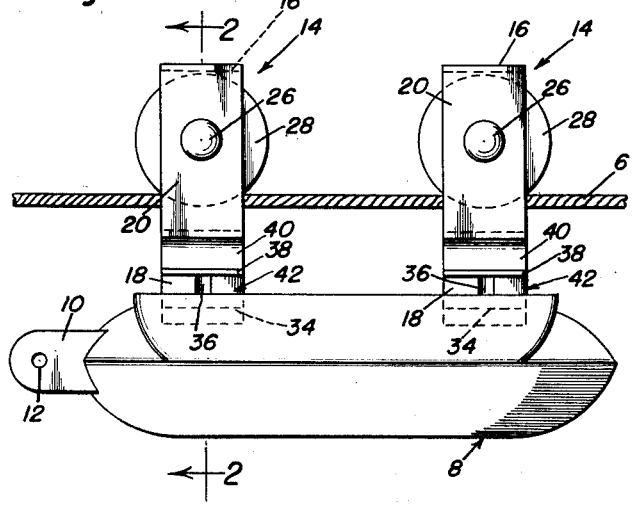
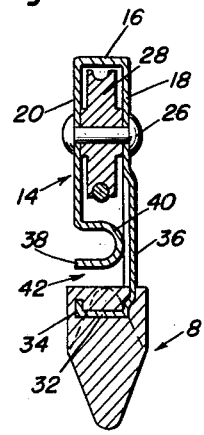
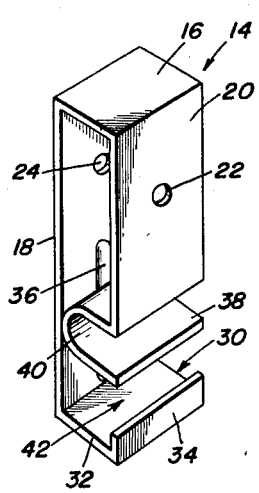
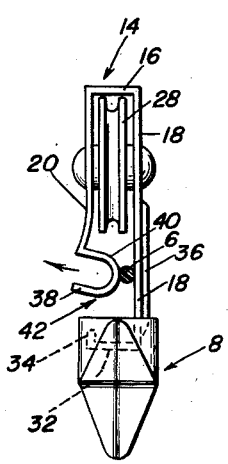
Stephen T. Greske
INVENTOR.

Patented May 26, 1953

2,639,535

UNITED STATES PATENT OFFICE 2,639,535

FISHING TROLLEY WITH IMPROVED TROLLEY FRAME

Stephen T. Greske, Chicago, Ill.

Application August 3, 1950, Serial No. 177,514

2 Claims. (Cl. 43—27.2)

The present invention relates to certain new and useful structural improvements in a novelly constructed fishing trolley and has particular reference to the manner in which the pulley-equipped frames are made.

There are, of course, fishing trolleys of many and varied forms. An example type fishing trolley is similar to the one herein shown and described which, as is evident, is characterized by an elongated sinker or weight to which the fishing line is connected. Brackets or fixtures, usually called pulley frames, are fastened at longitudinally spaced points to the sinker and the pulleys in the frames are adapted to be rollably mounted on the relatively stationary trolley line. Fishermen are continually confronted with the nuisances of attaching a trolley to or removing same from a trolley line. Fishing trolley manufacturers are, therefore, aware of this problem. The instant invention is such in construction that it seeks, and successfully so, it is believed, to properly meet and cope with the problem.

In carrying out the principles of the present invention, each pulley frame is constructed from flat strap metal, the latter being bent upon itself to define spaced parallel limbs for properly accommodating and mounting the pulley. The free end of one limb, the longer one, is anchored in the sinker or weight. The free end of the other, the shorter limb, is provided with a simple and practical U-bend and this coacts with the intermediate portion of the first-named limb to provide a latch-like clasp which makes practical and easy the steps of applying and removing the trolley and insures effective maintenance of same, once it is in position on the trolley line.

Since it is old in the art to provide an elongated sinker or weight with longitudinally spaced pulley frames, it will be celar that novelty is predicated on the improved latch-type frame which carries the pulley.

Other objects and advantages will become more readily apparent from the following description and the accompanying drawing.

In the accompanying drawing, wherein like numerals are employed to designate like parts throughout the views:

Figure 1 is a side elevational view of a double pulley-equipped fishing trolley constructed in accordance with the principles of the present invention;

Fig. 2 is a section on the vertical line 2—2 of Figure 1, looking in the direction of the arrows;

Figure 3 is a perspective view of the pulley frame illustrating its novel features of construction, the pulley being omitted; and Figure 4 is an end elevation from right to left in Figure 1 showing the manner in which the latch or clasp is sprung to open position to facilitate the steps of applying and removing the trolley.

Referring now to Figure 1, the relatively stationary or fixed trolley line is denoted by the numeral 6. The weight or sinker, which is of any suitable shape and proportion, is denoted by the numeral 8 and is provided at its trailing end with an extension 10 having an aperture 12 providing a suitable "eye" for the fishing line (not shown).

As before stated, the improvement in the subject matter under advisement has to do with the special construction of the pulley frames. These are perhaps sometimes referred to by others as brackets and fixtures. It is believed that the expression "frame" is apt and the same will be hereinafter used. It has been before stated that while it is customary to use at least two such pulley units or frames, the novelty is, of course, directed to the manner of making a single frame. To this end, attention is directed to Figure 3 wherein the improved frame is denoted by the numeral 14. It is made from flat strap metal which is bent upon itself between its ends to form a connective or bight portion 16. Extending at right angles from this and in spaced parallelism are the companion long and short limbs 18 and 20, respectively. These are apertured as at 22 and 24 to accommodate a suitable axle or hub 26 for the customary grooved pulley or sheave 28. The free end portion of the long limb 18 is formed into a hook-shaped foot which may perhaps be suitably described as an anchoring hook 30. It comprises a lateral bend 32 and a flange or bill portion 34. These features 32 and 34 are completely embedded and concealed in the weight or sinker 8 in the manner shown best in Figure 2. The long limb is provided with an indentation 36 providing a reinforcing rib. This limb is rigid and the other shorter limb 20 is resilient. The free end of the short limb is provided with a U-bend, the tip or terminal 38 of which provides a suitable finger-piece. The curved bight portion 40 forms a cam-like clasp. Normally, the portion 40 rests in contact with the inner surface of the limb 18 and effects a suitable latch-like clasping action for the trolley line 6. It will be noticed that there is a space at 42 and this constitutes the entrance and exit opening for the trolley line. The U-bend may be either pulled open with one's fingers or simply forced open by "riding" the trolley line through the space or entrance 42 and pressing it between the long limb and the cam-like bight 40.

Novelty is predicated on the long and short limbs in spaced parallelism, the long limb 18 having hook means 30 spaced from the clasp or U-bend and forming an entrance and exit opening 42. Primarily the novelty is directed to the U-bend which functions as an easily openable and closable clasp for the trolley line and which, obviously, expedites the steps of attaching the trolley to or removing same from the trolley line.

It is thought that persons skilled in the art to which the invention relates will be able to obtain a clear understanding of the invention after considering the description in connection with the drawing. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A hanger bracket for a trolley line pulley formed from flat strap metal into a frame, the latter embodying long and short constantly spaced parallel limbs, corresponding ends of said limbs being free, the free end of the long limb having a rigid sinker anchoring hook with a short rigid bill portion aligned with said short limb, and the free end of said short limb terminating in a U-bend spaced from said hook, said U-bend being at right angles to said limbs and situated in the space between said limbs and having its bight portion in yielding contact with an intermediate portion of said long limb.

2. A fishing trolley for use on a trolley line comprising a sinker having a fishing line eye, a trolley line pulley, and means for attaching said pulley to said sinker, said means embodying a frame having spaced parallel limbs, one limb being substantially rigid and one end thereof being free and having a rigid hook-shaped terminal wholly embedded in said sinker, the remaining limb being shorter in length than said first named limb, being resilient and terminating in a U-shaped bend, the latter being disposed in the existing space between the respective limbs and having an upper portion at right angles to said short limb, having a curvate bight portion resiliently contacting an intermediate portion of said long limb and further having a free lower portion disposed in spaced parallelism to an adjacent surface of said sinker and cooperating with the latter in providing an unobstructed entrance and exit opening for a trolley line.

STEPHEN T. GRESKE.

References Cited in the file of this patent

UNITED STATES PATENTS

| Number | Name | Date |
|---|---|---|
| 1,196,087 | Crume | Aug. 29, 1916 |
| 1,675,286 | Van Valkenburgh | June 26, 1928 |
| 2,206,569 | John | July 2, 1940 |